United States Patent
Scmitt-Lewen et al.

(10) Patent No.: US 11,104,170 B2
(45) Date of Patent: Aug. 31, 2021

(54) METHOD FOR VERIFYING THE AUTHENTICITY OF PRINTED PRINTING MATERIALS BY USING A DYNAMIC MASK

(71) Applicant: HEIDELBERGER DRUCKMASCHINEN AG, Heidelberg (DE)

(72) Inventors: Martin Scmitt-Lewen, Heidelberg (DE); Felipe Fernandes, Darmstadt (DE); Felix Braig, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/888,941

(22) Filed: Jun. 1, 2020

(65) Prior Publication Data
US 2020/0376875 A1 Dec. 3, 2020

(30) Foreign Application Priority Data
Jun. 1, 2019 (DE) .............................. 102019003889

(51) Int. Cl.
| | |
|---|---|
| B41M 3/14 | (2006.01) |
| B42D 25/355 | (2014.01) |
| G06K 9/00 | (2006.01) |
| G06K 19/10 | (2006.01) |
| G06K 19/14 | (2006.01) |
| G06K 19/18 | (2006.01) |
| G06K 19/08 | (2006.01) |
| G06K 17/00 | (2006.01) |
| G06K 9/46 | (2006.01) |

(Continued)

(52) U.S. Cl.
CPC ............. *B41M 3/14* (2013.01); *B42D 25/355* (2014.10); *G06K 9/00577* (2013.01); *G06K 2009/0059* (2013.01)

(58) Field of Classification Search
CPC ... B41M 3/14; B42D 25/355; G06K 9/00577; G06K 2009/0059; G06K 9/00
USPC .............. 283/67, 70, 72, 73, 74, 93, 98, 901
See application file for complete search history.

(56) References Cited

U.S. PATENT DOCUMENTS

| | | |
|---|---|---|
| 5,521,984 A | 5/1996 | Denenberg et al. |
| 8,950,662 B2 | 2/2015 | Soborski |

(Continued)

FOREIGN PATENT DOCUMENTS

EP 2820592 B1 1/2018

*Primary Examiner* — Justin V Lewis
(74) *Attorney, Agent, or Firm* — Laurence A. Greenberg; Werner H. Stemer; Ralph E. Locher (57) ABSTRACT

A method for verifying the authenticity of printed printing materials includes applying a random pattern to a printing material during a printing procedure in a first step. The printed printing materials are captured by a first electronic reading device during a production run, the captured data are transmitted to a computer and encrypted data are generated in the computer from the captured data of the applied random pattern. In a second step the printed printing material is at least partly scanned by using a second electronic reader and the authenticity of the printed printing material is ascertained from the scanned image data by a comparison with the encrypted data of the random pattern. A dynamically generated mask is used in the computer for selecting the random pattern when generating the encrypted data of the random pattern on the printed printing material.

11 Claims, 8 Drawing Sheets

(51) Int. Cl.
*G06K 9/62* (2006.01)
*G06Q 30/00* (2012.01)

(56) References Cited

U.S. PATENT DOCUMENTS

| | | |
|---|---|---|
| 10,380,601 B2 | 8/2019 | Soborski |
| 10,387,703 B2 | 8/2019 | Soborski |
| 10,482,303 B2 | 11/2019 | Soborski |
| 10,546,171 B2 | 1/2020 | Soborski |
| 10,552,848 B2 | 2/2020 | Soborski |
| 2006/0109515 A1* | 5/2006 | Zhao .................... H04L 9/3226 |
| | | 358/3.28 |

* cited by examiner

METHOD FOR VERIFYING THE AUTHENTICITY OF PRINTED PRINTING MATERIALS BY USING A DYNAMIC MASK

CROSS-REFERENCE TO RELATED APPLICATION

This application claims the priority, under 35 U.S.C. § 119, of German Patent Application DE 10 2019 003 889, filed Jun. 1, 2019; the prior application is herewith incorporated by reference in its entirety.

BACKGROUND OF THE INVENTION

Field of the Invention

The present invention relates to a method for verifying the authenticity of printed printing materials, in which a random pattern is applied to a printing material during a printing procedure in a first step, the printed printing materials are captured by a first electronic reading device during a production run, the captured data are transmitted to a computer and encrypted data are generated in the computer from the captured data of the applied random pattern, and in a second step the printed printing material is at least partly scanned by using a second electronic reader and the authenticity of the printed printing material is ascertained from the scanned image data by comparison with the encrypted data of the random pattern.

A generic method allows the verification of the authenticity of a printed printing material on the basis of the optical capture of the surface structure thereof, i.e., it allows determination of whether the printed printing material originates from an unauthorized source or has been at least partly altered. In the present application, a printing material should be understood to mean, as a matter of principle, any material with a surface that can be processed within the scope of a printing method. In this case, this can be conventional printing materials such as paper, cardboard, films and planar workpieces; however, it may also relate to arched or curved surfaces of three-dimensional bodies made of plastic or metal, for example.

Such a method has been disclosed in European Patent EP 2 820 592 B1, corresponding to U.S. Pat. Nos. 10,552,848; 10,546,171; 10,482,303; 10,387,703; 10,380,601; and 8,950,662, in which naturally occurring changes in certain regions on the surface of an object are used to generate corresponding data fitting to the object in order to thus produce a signature that identifies the original object. That information is stored separately from the object, with it being possible to access the information when the authenticity of an object should be verified in view of the original object. In the process, the naturally occurring variations are subdivided into various categories which are weighted differently, to be precise on the basis of the printer type that has generated an authentic printed marking.

BRIEF SUMMARY OF THE INVENTION

It is accordingly an object of the invention to provide a method for verifying the authenticity of printed printing materials by using a dynamic mask, which overcomes the herebefore-mentioned disadvantages of the heretofore-known methods of this general type and which increases protection against counterfeiting.

With the foregoing and other objects in view there is provided, in accordance with the invention, a method for verifying the authenticity of printed printing materials, which comprises applying a random pattern to a printing material during a printing procedure in a first step, the printed printing materials are captured by a first electronic reading device during a production run, the captured data are transmitted to a computer and encrypted data are generated in the computer from the captured data of the applied random pattern, in a second step the printed printing material is at least partly scanned by using a second electronic reader and the authenticity of the printed printing material is ascertained from the scanned image data by comparison with the encrypted data of the random pattern, and a dynamically generated mask is used in the computer for selecting the random pattern when generating the encrypted data of the random pattern on the printed printing material.

It is important for reliability, when verifying the authenticity, for the random patterns to achieve a particularly high degree of randomness. The higher this degree of randomness, the more secure the encryption method and the lower the probability of a manipulated printed printing material nevertheless being identified as authentic. Some solutions currently introduce a very high degree of technical complexity in order to obtain this high degree of randomness, for example by virtue of a plurality of light sources being observed by cameras and random values being generated from the behavior of the light sources. In the present invention, this effort should be minimized but high security should be achieved at the same time. For this reason, provision is made for concentrating on the regions on the surface of the printed printing material which obtain a particularly high degree of randomness. These regions are then marked by using a dynamically generated mask so that the corresponding random features for generating the encrypted data of the random pattern on the printed printing material are selected from these regions. There are a number of options, as will be presented below, in order to obtain these regions which are selected in the computer by the dynamically generated mask.

In a preferred embodiment of the present invention, provision is made for an electronic printing image present on the computer in a prepress stage to be analyzed by the computer with respect to the randomness arising during printing, in particular with the substrate, the printing ink being used and the content of the printing image being taken into account, and one or more regions that have a high degree of randomness to be selected as a mask. By taking into account the content of the printing image, the substrate used during the printing procedure and the printing ink used in the process, the computer with the appropriate software can identify, due to known behavior, the regions which during the actual printing procedure, the production run, will have a particularly high degree of randomness since the printing process is particularly unstable there. On the basis of this prediction by the computer, the mask can then be chosen for the corresponding regions in such a way that the correspondingly encrypted data of the random pattern are then generated there. This allows the mask to be re-created for each print order and prior to each production run, which is why this mask is referred to as a dynamic mask. This is so important because the conditions during printing can change even in the case of a repeated order. Ink and substrate are never 100% identical and constant in terms of their properties and temperature and humidity also have an influence on the print and hence on the randomness, which is why it makes sense to dynamically adapt the mask even in the case of repeated orders.

In a particularly advantageous embodiment of the present invention, provision is made for a printing image from a prepress stage to be printed onto a printing material in a printing machine in a predetermined number by using a printing method, for this predetermined number of prints to be captured by using a first electronic reader, and for the computer to select the region or the regions which have a high degree of randomness as a mask on the basis of the degree of randomness of regions from the predetermined number of printed printing materials. A particularly high degree of randomness is achieved in this method because certain process knowledge is not already introduced in the prepress stage. Instead, at least one printed printing material is actually produced at first on the basis of the digital printing image from the prepress stage, with the printed printing material then being read by a first electronic reader, such as an image inspection device in the printing machine. This printed printing material thus generated is then compared among themselves and/or with the digital printing image from the prepress stage and the regions with the greatest deviations with respect to stability in the printing procedure are then compared with image data from prepress. Then, these unstable regions are marked accordingly by a mask and are used as a basis for the encryption of the random pattern. In this way, the randomness of a printing method caused by the unstable printing process is used as a particularly well-functioning randomizer with a high degree of randomness.

In one embodiment of the invention, provision is made for certain regions to be provided in the printing image in the prepress stage, which regions are expected to have a particularly high degree of randomness due to their image nature. Certain image structures such as particularly fine lines that are disposed very close together often lead to particularly high deviations, not conceivable in advance, between the digital copy in the prepress stage and the actually produced printing image on the printed printing material within the printing process. Therefore, these regions are particularly suitable for generating a particularly high degree of randomness, and so it is advantageous to select these certain regions and mark these with a mask. In this respect, the regions in the printing image that have particularly unstable running-on properties come into question in particular.

In a further embodiment of the invention, provision is made for the number of printed printing materials captured in the start-up printing procedure to be between 1 and 30. If a plurality of printed printing materials are initially generated during the start-up printing procedure and if these are compared with the digital copy in order to mark the corresponding unstable regions by way of the mask, the selection of the regions becomes ever more exact if it is not only a single printed printing material that is compared with the digital copy but if a plurality of printed printing materials can be compared with one another and/or with the digital copy. However, it turns out that the insight with respect to the degree of randomness is no longer increased substantially once the number of printed printing materials exceeds 30 and so it is not expedient to have a greater batch for selecting the suitable regions and for creating the mask.

In a further embodiment of the invention, provision is made for the computer to use a segmentation matrix when deciding on the mask, with the segmentation matrix subdividing the surface of the printed printing material into a plurality of portions. This segmentation matrix contains many smaller regions, which are each evaluated separately and which are each checked for their suitability with respect to particularly high randomness. Consequently, it is then possible to select these regions which have the particularly high degree of randomness. In so doing, it is possible to devise certain minimum requirements with respect to the degree of randomness and with respect to the deviation between the highest and the lower degrees of randomness, and so only the regions that meet these requirements are then selected for the mask.

In a further embodiment of the invention, provision is made for a cipher code to be individually printed on in digital fashion during or following the production run when producing the printed printing material. During the actual production of the printed printing materials in the production run, which are supplied to customers, it is not only the printing image that is applied in this case but a cipher code is additionally individually digitally printed thereon, for example using an inkjet method, with the cipher code containing encrypted data of the random features which have been selected as being suitable and correspondingly encrypted within the scope of the creation of the random features during the printing. This allows the printed printing materials supplied to the customers to be verified for authenticity at a later stage using a second electronic reader without a connection to a database. In the process, the cipher codes could also contain model numbers or serial codes which are stored in a database together with the encrypted data of the random pattern. The code could also be applied following the production run during the further processing of the printing. In this case, the stack with the printed printing materials is scanned by the first electronic reader during the further processing and a code is respectively applied, for example by an inkjet printer device. As a result, applying the code is spatially decoupled from applying the printing image in the printing machine and can be implemented, for example, only during the further processing into packaging. Then, the first electronic reader is disposed at the location of the postpress processing.

Further, provision is made for there to be a comparison of the data of the captured printed printing material with the encrypted data of the random pattern in the database by way of a wireless or wired network connection in the second step of verifying the authenticity of printed printing materials by using the second electronic reader. In this case, the reader has access to the encrypted data in a database, e.g., through an Internet connection, and so appropriate processing of the image data of the second electronic reader renders it possible to compare the captured random features with the encrypted data of the random features in the database and then to verify the authenticity of the currently captured printed printing material by way of appropriate specifications with respect to the authenticity, such as Hamming distances with respect to the similarity.

Alternatively, there could also be a comparison of the data of the captured printed printing material with the additionally printed-on cipher code within the scope of the verification of the authenticity. In this case, there is no need to access a database. It suffices for the second electronic reader to capture both the random features on the captured printed printing material and also the additionally printed-on cipher codes, which in turn contain the random features in encrypted form, which then facilitates a comparison between these encrypted data and the data of the captured printed printing material and consequently renders a verification of the authenticity possible without an Internet connection to a database.

Other features which are considered as characteristic for the invention are set forth in the appended claims.

Although the invention is illustrated and described herein as embodied in a method for verifying the authenticity of printed printing materials by using a dynamic mask, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawing in detail, it is seen that a method is described which allows the production of a forgery-proof (item level) feature for identification and authentication purposes and for verifying the authenticity by printing technology. Provision is made for random structures to be printed to be used to this end and for these random structures to be analyzed only in image regions selected in targeted fashion, which image regions are found by a segmentation approach. The image regions thus found are referred to as a mask 6, which provides a spatially adapted and, as a rule, distributed analysis region in the printing image for an "optimized" identification, for example by using Hamming distances.

To this end, a printing image of a print order is initially produced electronically in a prepress stage. The printing image thus generated is printed within the scope of a start-up printing run in a small number with a batch size L1, L2, L3, L4 onto a printing material 1 in order to ascertain a mask 6 which must then be used subsequently further during the production run and for analysis purposes. Consequently, the mask 6 is an important element for the identification and authentication and the verification of authenticity since making a possible forgery is more difficult without knowledge about the type of mask.

Figure 1:
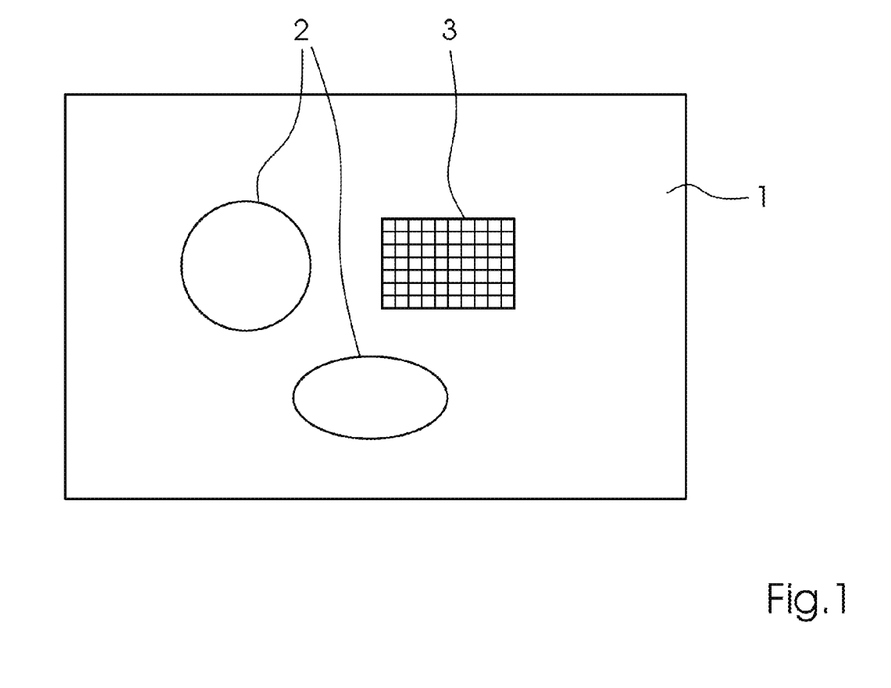
FIG. 1 is a diagrammatic, top-plan view of a printed printing material with two regions of good randomness and a region for a detailed analysis.

Optionally, the printing image is constructed in such a way that regions 2 which due to their nature with respect to the image content and/or printing method would be expected to have a high degree of randomness are already provided, for example by virtue of using certain patterns that promote the randomness. The selection method for setting the mask 6 is typically restricted to these regions 2. A region 3 for the detailed analysis, which is subjected to selection and segmentation in the computer, is the region from which the mask 6 is derived; see FIG. 1 and FIG. 2. However, in principle, all portions of the printing image on the printed printing material 1 can be subjected to an analysis by segmentation in order to find a suitable mask 6. That is to say, a plurality of masks 6 can be obtained for the respective examined portions as a matter of principle. However, reference below is only made to the mask 6, even if the mask 6 includes a plurality of portions. This means that this then relates to the best possible portion from the printing image, in particular the regions 2, which were selected.

Figure 5:
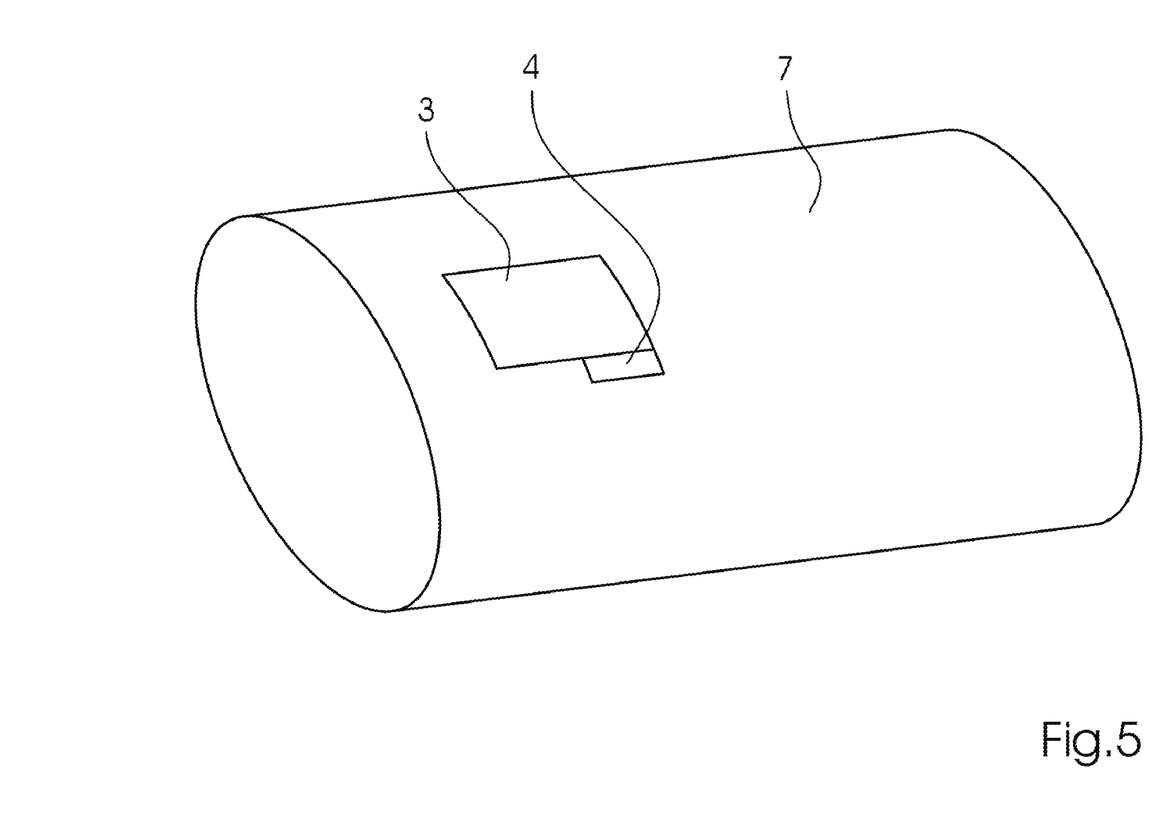
FIG. 5 is a perspective view of a cylindrical printed printing material with a region for the detailed analysis and an optional cipher code.

It is also possible for the feature already to be present, as is the case for natural, random textures on existing surfaces, for example on curved surfaces of an arched body 7 as in FIG. 5. Then, the steps for ascertaining the mask 6 appear as follows:

There is a total of n objects intended for discrimination available.

A total of a objects are selected (a<<n).

A region 3 for the detailed analysis is selected, and optically read and digitized by using a camera.

The images are analyzed in a computer using an assessment algorithm.

The region 3 is segmented and analyzed, and the mask 6 is generated therefrom.

An optimized, spatially dependent mask 6 is set. The mask 6 represents the regions in which a high degree of randomness is present.

Figure 3:
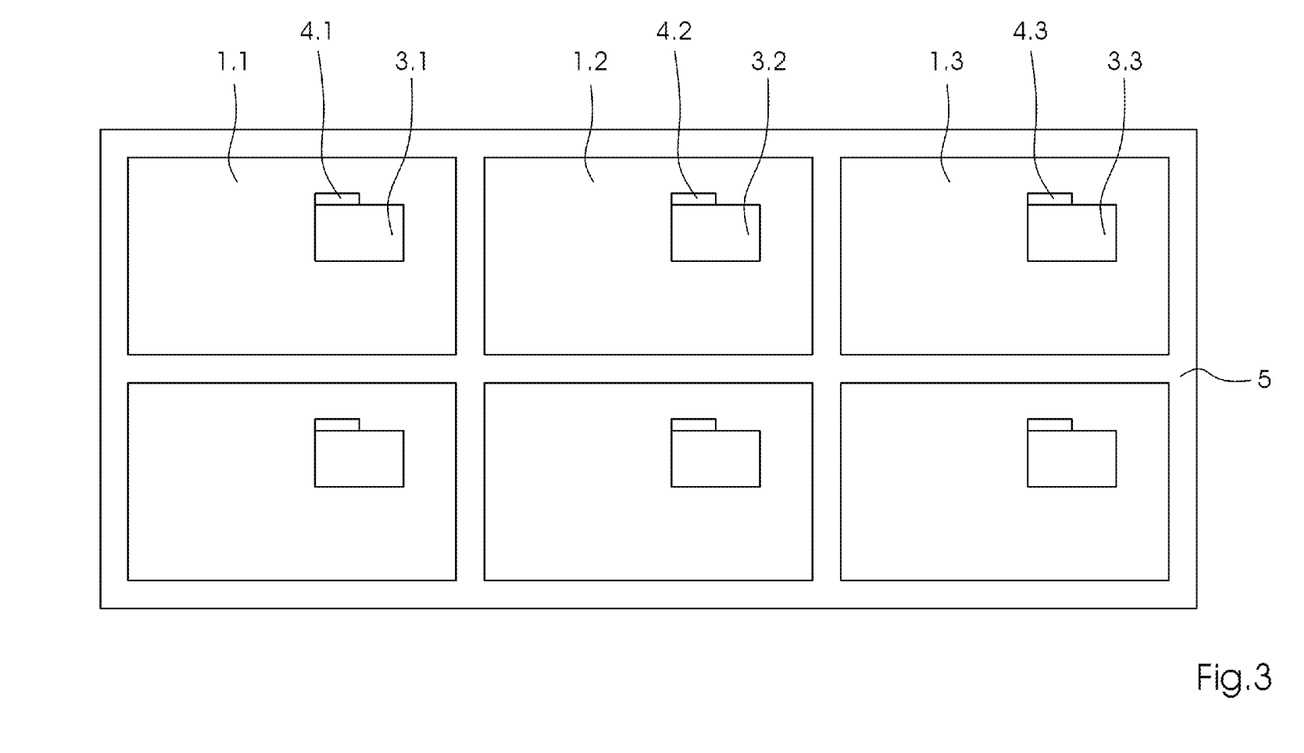
FIG. 3 is a top-plan view of a printed printing material with a plurality of uses and regions for the detailed analysis and optional cipher codes.
Figure 4:
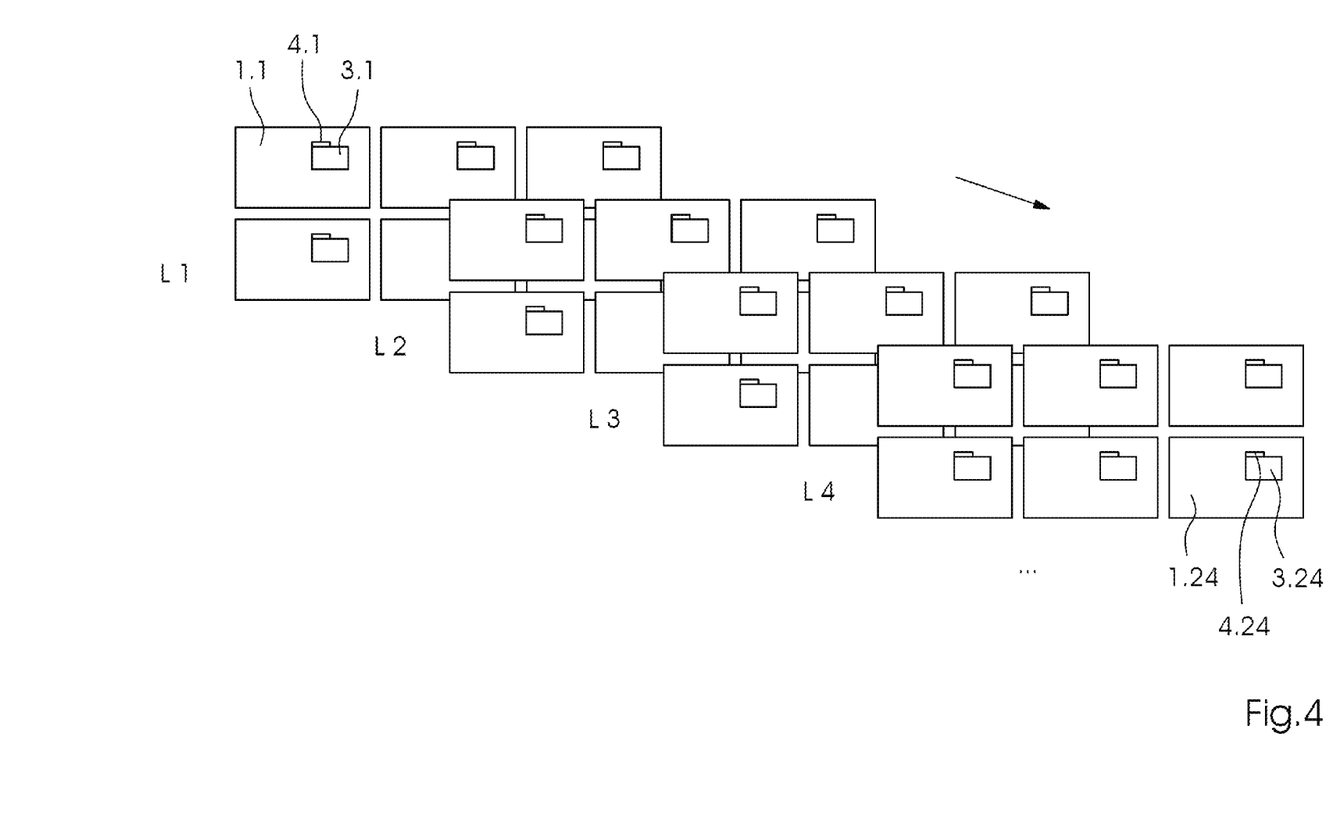
FIG. 4 is a diagram showing a printing procedure for generating random features in a batch size on printed printing materials with a plurality of print ups.

The entire process for products produced by printing, e.g., printed sheets 5 or printed packaging, which carry identification or authentication features and which therefore should be identified or authenticated, is implemented in these three partial method steps:

1. Partial method for setting the mask within a printing image on the printed printing material 1:
   1) Printing image creation in the digital prepress stage, the printing image having different regions.
   2) Creation of regions with stable running-on properties with the exception of regions 2 and 3 as per FIG. 1.
   3) Regions 2 with particularly unstable running-on properties, e.g., specific patterns which merge stochastically, etc., are identified. As a rule, the regions 2 are spatially separated, particularly if the regions 2 are configured accordingly in the prepress stage.
   4) Printing, e.g., by inkjet printing, a batch size L1, L2, L3, L4 as per FIG. 4, in particular using the same printing process with respect to method, inks, substrate, image data from prepress as in the subsequent production run.
   5) Printing 1 to 30 specimens using the identical image record.
   6) Digitization by a camera and image processing software and preprocessing of the specimens as per FIG. 6.
   7) Selection of a region 3 which should be examined for robust authentication; in particular, the selection is implemented in the regions of the regions 2 with unstable running-on properties as per FIG. 3.

Figure 2:
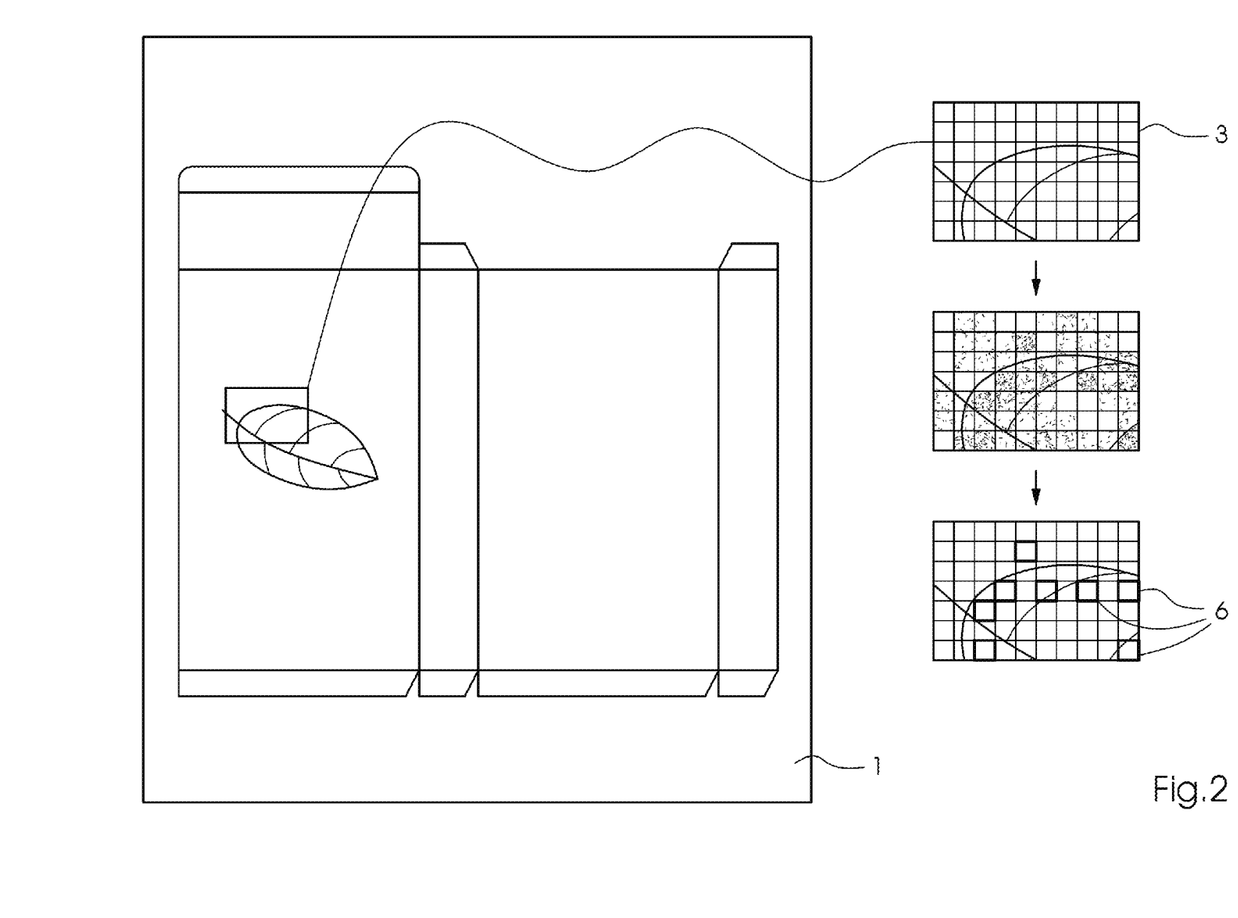
FIG. 2 is a top-plan view of a printed printing material showing a selected region with good randomness as a basis for generating a mask.

8) Segmentation of the region 3, e.g., in the form of a matrix as per FIG. 2.
9) Analysis of the 1 to 30 specimens, in each case in the region 3 in view of the best discrimination for setting the mask 6 while taking into account the segmentation matrix. The portion of the region 3 which forms the basis for the identification or authentication feature is referred to as mask 6.
10) Spatial assignment of the mask 6 to the printing image and its image data.

In general, the mask can be spatially distributed or locally concentrated. The distinction according to the terms "distributed" or "concentrated" is a question of the optical measurement area of the electronic reader, for instance a flat bed scanner or a microscope camera.

2. Partial method for using the mask 6 for extracting authentication features for a printed product on a printed printing material 1 and feature management:
1) Printing, e.g., product packages 5 in a batch size x with the printing image from the 1 partial method and with the same printing process with respect to method, inks, substrate, image data from prepress, and optionally printing plate as in partial method 1 as per FIG. 3 and FIG. 4.
2) Digitizing and preprocessing the specimens as per FIG. 6.
3) Feature extraction using the mask 6 for extracting the authentication features for the size of the sample x, typically 100 to $10^{11}$.
4) Storing the authentication features of the x samples in a database for central management of the x samples.
5) Optionally, additional serialization numbers or serialization codes 4 are printed, which are stored in the database together with the authentication features of the x samples.

As an alternative to storing in a database, the authentication features of the x samples are individually converted into a unique cipher code 4, which is individually digitally printed to each of the x samples in such a way that the feature data are managed in decentralized fashion and offline authentication is subsequently possible.

3. Partial method for using the authentication features following the production by printing:
1) Optical reading of the region 3, digitization and preprocessing.
2) Analyzing the printing image in the region 3 using the mask 6.
3) Feature extraction.
4) Comparison with authentication features in the relevant database in the case of online use by the electronic reader.
5) Optional comparison of the authentication features with the additionally printed cipher code 4, which provides the information locally for offline use.
6) Authentication verification by comparison or correlation.

Figure 7:
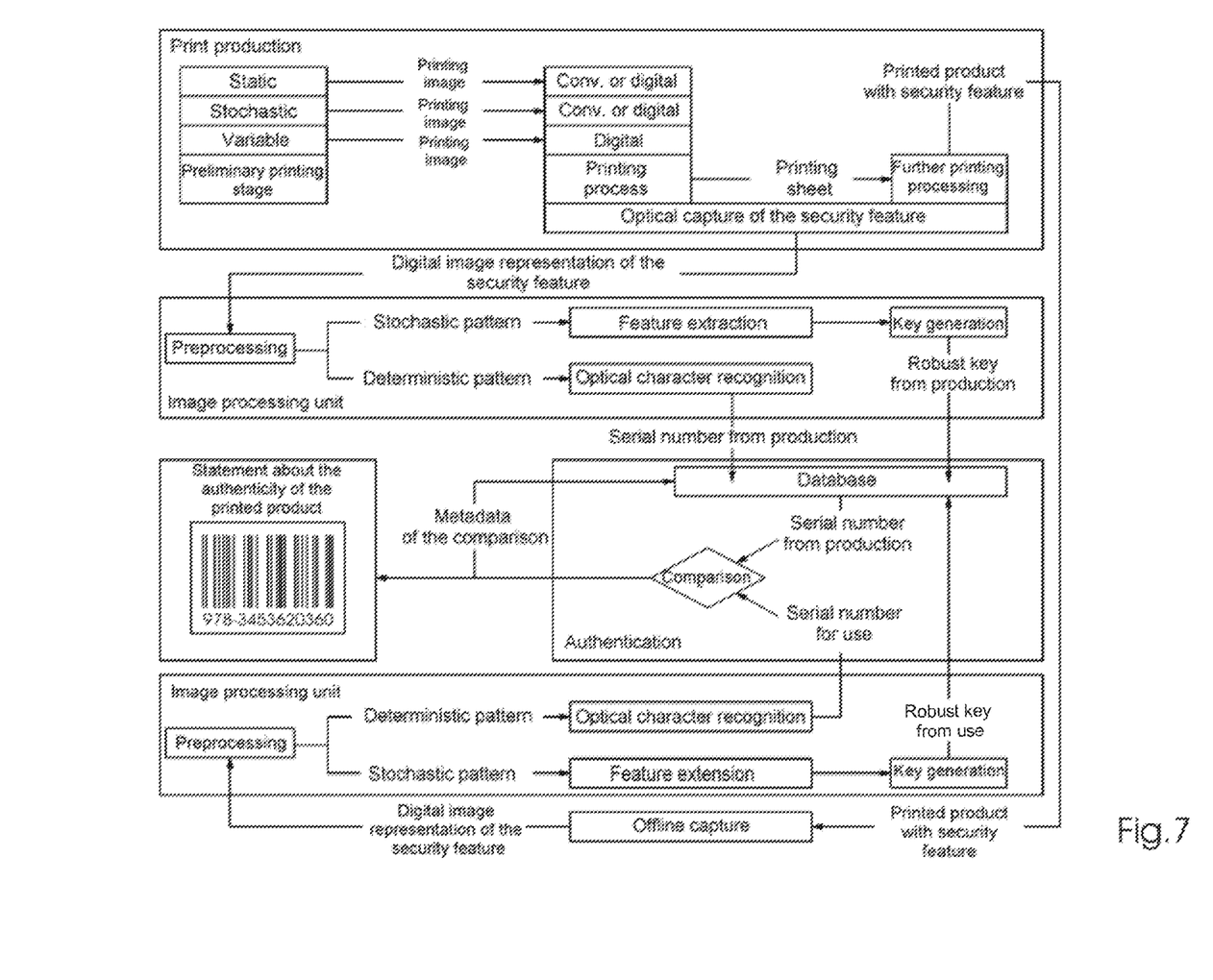
FIG. 7 is a flow diagram showing the use of the method according to the invention in a printing process and a verification of authenticity on a supplied printed product.

The steps of a production and authentication process for a combined printing feature formed of a stochastic printing pattern and an alphanumeric code 4 are described in supplementary fashion in FIG. 7. The illustrated process is subdivided into print production, image processing in the production phase and image processing in the use phase, into authentication. The printing image in the print production on the printed printing material 1 can be subdivided into a static, a stochastic and a deterministic variable component. The static component contains the actual printing image during the production run. Using the example of packaging 5, this may include the optical components such as brand name, description of the content and finishing.

Figure 8:
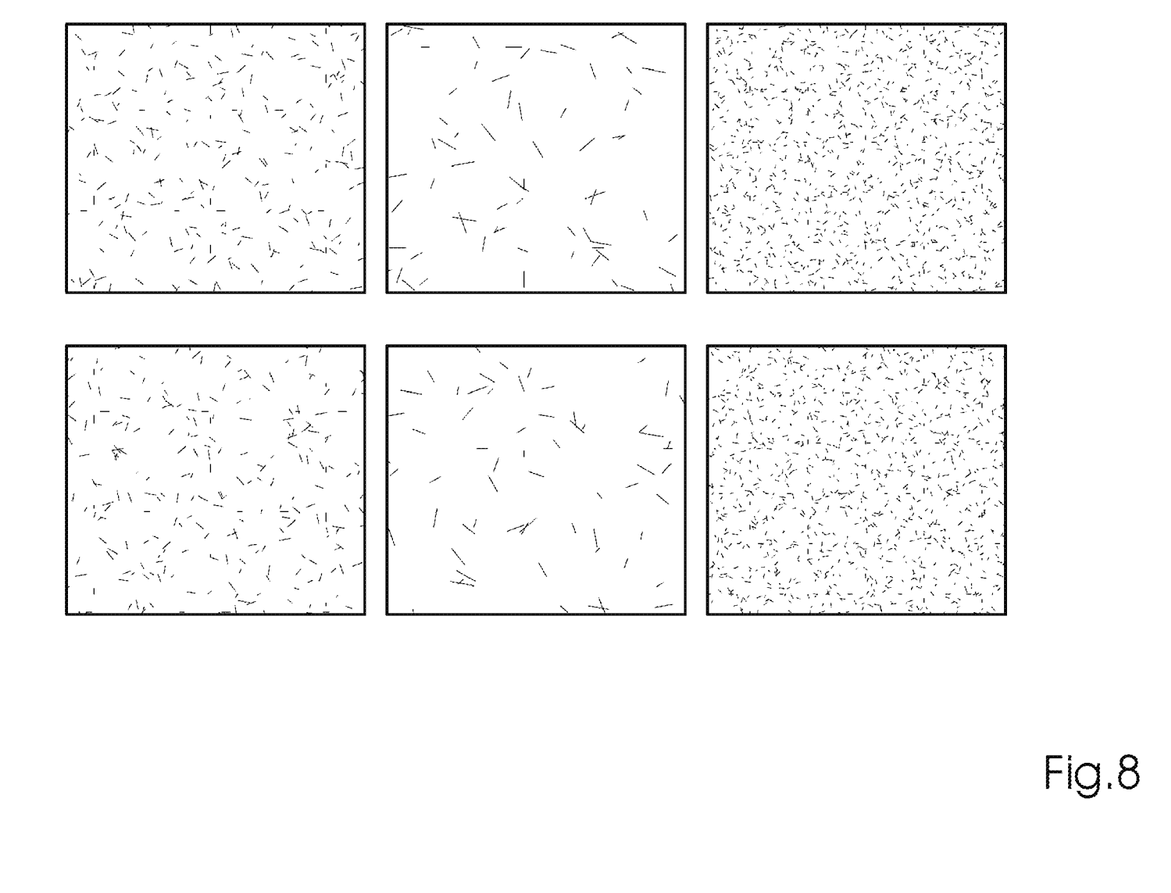
FIG. 8 is a top-plan view showing random features generated by different printing methods.

The stochastic part of the printing image on the printed printing material 1 contains a stochastic printing pattern. The deterministic variable part of the printing image contains the alphanumeric code 4. In this case, the coding 4 must be undertaken with digital printing; the stochastic printing pattern can be printed digitally, e.g., by using line or grid patterns as per FIG. 8, left, or conventionally, e.g., by drip-off varnish as per FIG. 8, right, or by flexographic printing with viscous fingering effects as per FIG. 8, center. The static component of the printing image can likewise be printed digitally and conventionally. Following printing, the printed sheet 1 is supplied to post press processes. The optical capture of the security feature can be implemented by using in-line measurement technology within the printing machine or during the further processing, e.g. post press or packaging. Following the print production, both the physical printed product 1 and a digital image representation of the security feature are consequently available. There is a second optical capture by an electronic reader during the use phase.

The object of the preprocessing in FIG. 7 lies in separating the individual parts of the printing image and consequently making available the stochastic printing pattern and the deterministic code 4 to the feature extraction or to the character recognition by using OCR technology. Additionally, the segmentation process for setting the mask 6 is still performed according to the invention. However, the segmentation process is not illustrated in FIG. 7.

The result of the image processing is, firstly, an extracted serial number and, following a key generation, a so-called robust key. This key is distinguished in that it remains unchanged under varying input data. In this case, so-called error-correcting codes are used for the key generation. Both the serial number and the robust key are ascertained during the production phase, see the top image processing in FIG. 7, and during the use phase, see the bottom image processing in FIG. 7. Should a security feature be identified or authenticated during the use phase, the robust key from the use phase is transmitted to a database. This database contains a serial number and a key from the production phase. The serial number stored for the transmitted key is output and can be compared with the serial number from the use. If the two serial numbers correspond, the security feature is identified or authenticated. Alternatively, the serial number from the use is transmitted to the database and the robust key stored for this serial number is loaded from the database. Comparing the stored robust key with the robust key from the use phase likewise allows an identification or authentication of the security feature. Additionally, it is conceivable, for example, for the metadata of the comparison, such as date and location of the comparison, to be stored and thereby for conclusions to be drawn with respect to the product cycle within the scope of track and trace.

Figure 6:
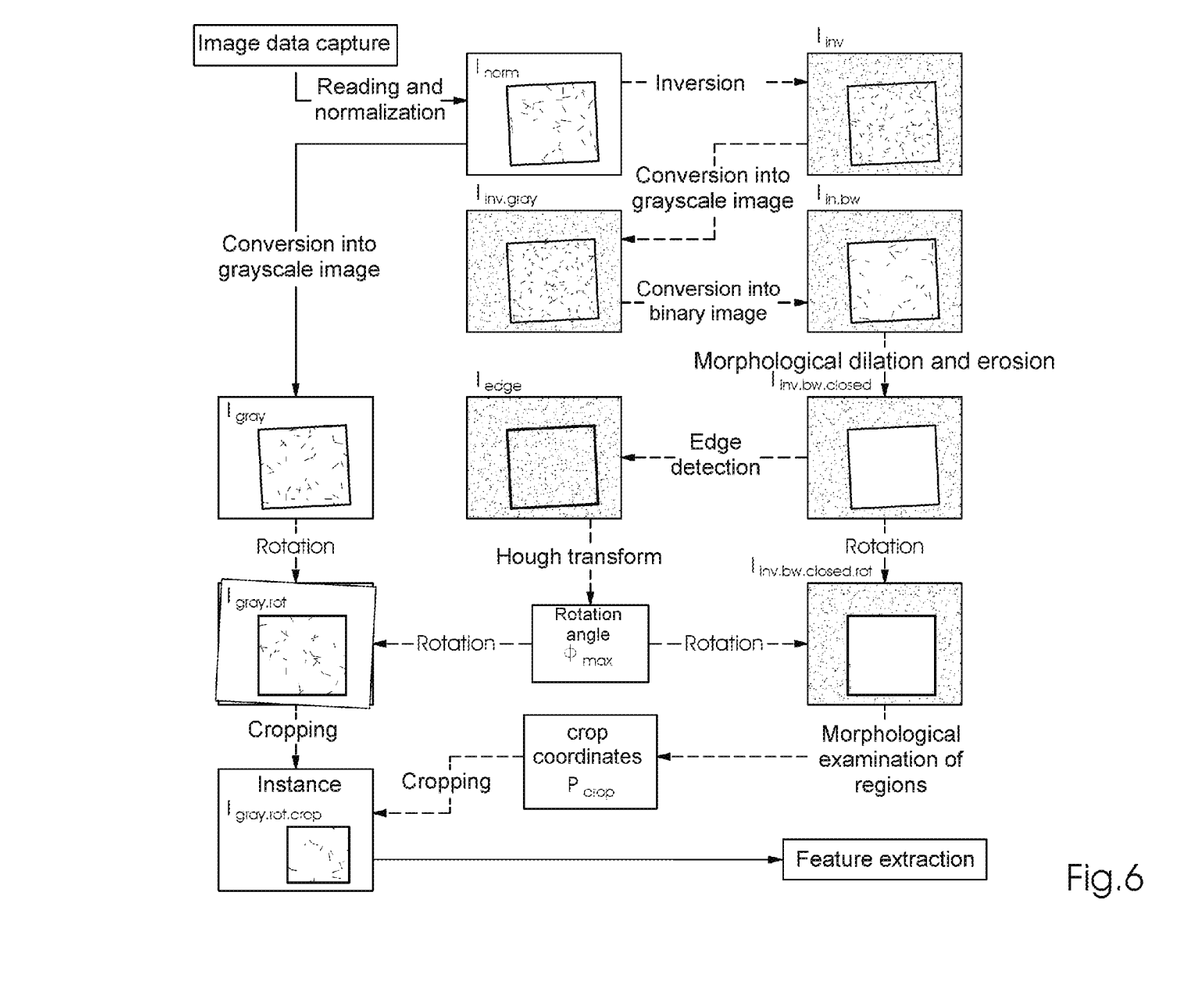
FIG. 6 is a flow diagram showing a method for generating encrypted data in a region with a high degree of randomness.

In partial methods 2 and 3, digitized printing images for the feature extraction are preprocessed uniformly as per FIGS. 6 and 7, including preprocessing, and consequently digitized printing images that are as homogeneous as possible are compared to one another or correlated. By way of example, the feature extraction can be performed by using Gabor filtering using specific parameter ranges such as wavelength, angles, filter size, etc. The comparison of the authentication features is implemented by using Hamming distances. It is possible to use an identification in the printing image which allows the mask 6, which belongs to the printed product 1, to be identified. By way of example, this is implemented through an additional code 4 or derived from the already available serialization or the cipher code 4. The use of printing image elements that promote randomness, for instance elements such as line and grid structures that promote random running together of cells, is one option for generating random structures. Another lies in the use of multicolor printing. Use is made of masks 6 which, in addition to the spatial aspects of the random structures, also take into account colorimetric aspects, i.e., the evaluation is implemented taking into account certain color channel components which are captured by the optical system, e.g., an in-line color measurement system in the printing machine. In addition to the inkjet printing method, the printing can be implemented by using flexographic printing, gravure or intaglio printing, combination printing, e.g., drip off as per FIG. 8, right, optionally with a pretreatment of the printed printing material 1. The method could also be used on surfaces not produced by using printing technology and on three-dimensional bodies 7.

The creation of a printing image-dependent mask 6 represents a sensitivity optimization with respect to the printing image and thereby allows the authentication features to be optimally integrated into given printing images and then therefore to be integrated into existing graphic image content. As a result of this, it may even be possible under certain circumstances to entirely dispense with optically bothersome separate authentication fields. Moreover, the mask 6 makes the identification system more secure in relation to possible hacking attacks since it is printing image-specific and will therefore always differ from product to product; this is because knowledge about the mask additionally makes such potential hacking attacks in product-overarching fashion more difficult. This also renders serialization possible without variable data printing, i.e., it renders the generation of identification features which make a product individual by non-variable printing possible.

LIST OF REFERENCE SIGNS

1 Printed printing material
2 Region with good randomness
3 Region for detailed analysis
4 Optional cipher code
5 Printed printing material with a plurality of printing ups
6 Mask
7 Curved surface
L1, L2, L3, L4 Batches from serial production

The invention claimed is:

1. A method for verifying an authenticity of printed printing materials, the method comprising the following steps:
   in a first step applying a random pattern to a printing material during a printing procedure, capturing the printed printing material by using a first electronic reading device during a production run, transmitting captured data to a computer and generating encrypted data in the computer from the captured data of the applied random pattern;
   in a second step at least partly scanning the printed printing material by using a second electronic reader and ascertaining the authenticity of the printed printing material from the scanned image data by a comparison with the encrypted data of the random pattern;
   using a dynamically generated mask in the computer for creating the random pattern when generating the encrypted data of the random pattern on the printed printing material; and
   using the computer to analyze an electronic printing image present on the computer in a prepress stage with respect to randomness arising during printing, and creating at least one region having a degree of randomness as the mask.

2. The method according to claim 1, which further comprises carrying out the step of analyzing with respect to randomness by analyzing a substrate being printed, a printing ink being used and a content of the printing image.

3. The method according to claim 1, which further comprises:
   printing a printing image from the prepress stage onto a predetermined number of printing materials in a printing machine by using a start-up printing run;
   using the first electronic reader to capture the predetermined number of printed printing materials; and
   using the computer to create the at least one region having a high degree of randomness as a mask based on a degree of randomness of regions on the predetermined number of printed printing materials.

4. The method according to claim 1, which further comprises using certain regions in the printing image in the prepress stage expected to have a predetermined degree of randomness due to their image nature.

5. The method according to claim 1, which further comprises creating regions in the printing image with unstable running-on properties for the mask.

6. The method according to claim 3, which further comprises selecting the predetermined number of printing materials in the start-up printing run to be between 1 and 30.

7. A method for verifying an authenticity of printed printing materials, the method comprising the following steps:
   in a first step applying a random pattern to a printing material during a printing procedure, capturing the printed printing material by using a first electronic reading device during a production run, transmitting captured data to a computer and generating encrypted data in the computer from the captured data of the applied random pattern;
   in a second step at least partly scanning the printed printing material by using a second electronic reader and ascertaining the authenticity of the printed printing material from the scanned image data by a comparison with the encrypted data of the random pattern;
   using a dynamically generated mask in the computer for creating the random pattern when generating the encrypted data of the random pattern on the printed printing material; and
   using a segmentation matrix in the computer when creating the mask, and using the segmentation matrix to subdivide a surface of the printed printing material into a plurality of portions.

8. A method for verifying an authenticity of printed printing materials, the method comprising the following steps:
   in a first step applying a random pattern to a printing material during a printing procedure, capturing the printed printing material by using a first electronic reading device during a production run, transmitting captured data to a computer and generating encrypted data in the computer from the captured data of the applied random pattern;

in a second step at least partly scanning the printed printing material by using a second electronic reader and ascertaining the authenticity of the printed printing material from the scanned image data by a comparison with the encrypted data of the random pattern;

using a dynamically generated mask in the computer for creating the random pattern when generating the encrypted data of the random pattern on the printed printing material; and individually printing-on a cipher code in digital fashion during or following the production run when producing the printed printing materials.

9. The method according to claim 8, which further comprises providing serial numbers or serial codes in the cipher code being stored in a database together with the encrypted data of the random pattern.

10. The method according to claim 9, which further comprises comparing the data of the captured printed printing material with the encrypted data of the random pattern in the database by using a wireless or wired network connection during the second step of verifying the authenticity of printed printing materials by using the second electronic reader.

11. The method according to claim 8, which further comprises comparing the data of the captured printed printing material with the additionally printed-on cipher code during the verification of the authenticity.

* * * * *

UNITED STATES PATENT AND TRADEMARK OFFICE
CERTIFICATE OF CORRECTION

PATENT NO. : 11,104,170 B2
APPLICATION NO. : 16/888941
DATED : August 31, 2021
INVENTOR(S) : Martin Schmitt-Lewen et al.

It is certified that error appears in the above-identified patent and that said Letters Patent is hereby corrected as shown below:

On the Title Page

Item (72) Inventors should be corrected to read:
Martin Schmitt-Lewen, Heidelberg (DE);
Felipe Fernandes, Darmstadt (DE);
Felix Braig, Heidelberg (DE)

Signed and Sealed this
Second Day of May, 2023

Katherine Kelly Vidal
*Director of the United States Patent and Trademark Office*